United States Statutory Invention Registration [19]

[11] Reg. Number: H453

Schmidlin [43] Published: Apr. 5, 1988

[54] DUAL SAFE FUZE WITH SPRING PRELOADER

[75] Inventor: Albertus E. Schmidlin, Caldwell, N.J.

[73] Assignee: The United States of America as represented by the Secretary of the Army, Washington, D.C.

[21] Appl. No.: 909,366

[22] Filed: Sep. 17, 1986

[51] Int. Cl.[4] ..... F42C 15/00; F41H 11/14

[52] U.S. Cl. ..... 102/221; 89/1.13; 102/254

[58] Field of Search ..... 102/256, 254, 221, 302, 102/403; 89/1.13, 1.34

[56] References Cited

U.S. PATENT DOCUMENTS 3,242,862 3/1966 Stegbeck et al. ..... 102/403

3,724,319 4/1973 Zabelka et al. ..... 102/403

*Primary Examiner*—Charles T. Jordan

*Attorney, Agent, or Firm*—Anthony T. Lane; Harold H. Card, Jr.; Michael C. Sachs

[57] ABSTRACT

The invention provides a novel dual safety fuze for a rocket-launched mine clearing linear high explosive charge. The fuze comprises a tubular housing, having a forward section containing two booster charges for initiating the line charge, an intermediate section containing two electric delay detonators, a rotor containing two lead charges positioned between the forward and intermediate sections and a rearward section mounting two axial arming pins, which provide a first and second lock of the rotor in the safe position. A novel rotor spring assembly includes a rotatable shaft, whose one end is attached to a torsion spring for rotating the rotor and other end has a screw-like configuration, which is engaged by a fork-like driver mounted on the first arming pin. The torsion spring is not torqued when the rotor is in the safe position; but when the linear charge is deployed on the ground, the first firing pin is withdrawn from the rotor by the pull of the arresting cable, causing (1) the driver to rotate the screw/shaft and thereby preload the torsion spring and (2) the short across the two detonators to open and thus close the firing circuit. The operator then closes a firing control switch which (1) energizes the electrically piston-actuated second arming pin, thereby removing the second safety lock and releasing the rotor to rotate to the armed position, and (2) simultaneously energizes the delay detonators. On expiration of the delay period the detonators actuate and fire the line charge.

9 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SECOND ARMING PIN
F IMT18 PISTON ACTUATOR
W

SHEAR PIN
A
ARREST CABLE ATTACH
T
SWITCH ASSY
EE
SPRING SHAFT ASSY
M
FIRST ARMING PIN
Y
Y
L
D
SC
SP
HO
S
R
ROTOR SPRING
E
N
V
G
DETENT & LOCKING BALL
C
ROTOR

SECOND ARMING PIN
F IMT18 PISTON ACTUATOR
W

TWISTED SPRING WIRE
ALTERNATE SPRING SHAFT ASSY
SHEAR PIN

A
ARREST CABLE ATTACH
T
SWITCH ASSY
EE
WELD
M
B
B
FIRST ARMING PIN
S
R
ROTOR SPRING
E
V
C ROTOR

DUAL SAFE FUZE WITH SPRING PRELOADER

GOVERNMENT INTEREST

The invention described herein may be manufactured, used and licensed by or for the Government for governmental purposes without payment to me of any royalty thereon.

BACKGROUND OF THE INVENTION

The U.S. Army presently employs a mine clearing system (USMCS) for providing a cleared path in a battlefield. The system comprises a mine clearing line charge (MICLIC), which is dispensed at the battle zone by a rocket attached to its front end and has attached to its rear end a fuze and an arresting cable, which in turn is anchored to a trailer containing the line charge and other system components. At the conclusion of the rocket trajectory, the rocket, line charge, fuze and cable are stretched out in a long line on the ground, and the fuze has been armed by the pull of the launcher cable on the arming pin so that the high explosives in the line charge can be initiated by detonators in the fuze assembly.

The current M1134 fuze employed in the MICLIC system is a single safe fuze, wherein the only safety is an arming pin, which holds the spring loaded rotor out of line. This pin is retracted when it is pulled by an arresting cable of the line charge, thereby fully arming the fuze.

The current M1134 fuze does not meet present military standards for fuze design safety criteria because it lacks safety redundancy, has no fail-safe feature and requires stored rotor spring energy to arm. In view of these safety deficiencies the current M1134 fuze is approved for use with the MICLIC only for field assembly to the line charge. Storage of the MICLIC with the fuze assembled is not permitted.

BRIEF SUMMARY OF THE INVENTION

The present invention relates to a novel and improved fuze for explosive devices, and particularly for line charge explosive systems. The fuze of the present invention is similar to the current M1134 fuze but in addition contains several unique and key elements, whereby the safety deficiencies of the present M1134 fuze are overcome, notably:

(1) a second; electrically activated arming pin, which provides a second safety feature; and (2) a novel rotor spring assembly, which provides safety redundancy.

The novel rotor spring is installed in its free state and hence does not have the stored energy which could inadvertently actuate the rotor and thereby arm the fuze, as in the present M1134 fuze. The novel rotor spring assembly comprises a torsion spring in combination with a screw element and a driver element, such as a fork-like device, which engages the screw element and is mounted on the first arming pin, which in turn is pulled by the tension in the cable arrest of the line charge. In this arrangement the linear motion of the arming pin is converted into rotation by the screw, which thereby winds up the rotor spring. At the same time the first arming pin (the first safety lock) is withdrawn from the rotor it also opens the shorting switch, thereby closing the electrical firing circuit of the electric detonators of the fuze. Thereafter, the second arming pin (the second safety lock) is actuated by an electrical pulse and thereby withdrawn from the rotor, allowing the rotor to rotate to the armed position for firing the line charge.

For a better understanding of the invention reference is made to the following description taken in connection with the accompanying drawings.

LIST OF FIGURES

OPERATION OF THE MICLIC WITH THE PRESENT M1134 FUZE

After the MICLIC trailer is positioned, the rocket launcher is raised and the shorting switch is closed, the operator rotates a firing control switch to the "ROCKET" position and repeatedly squeezes a 50 cap blasting machine (not shown). An electrical pulse is thereby transmitted through the special purpose electric cable via the launcher safety switch assembly and the rocket motor connector to ignite the rocket motor propellant, whereby the rocket propels the linear demolition charge across the selected area. As the last 10 feet of the arresting cable leaves the charge container, the lanyard attached to the charge container safety switch arm pulls the arm up and closes the electrical circuit so that the linear detonation charge can be initiated. When the rocket is in flight, the cable stretches, causing the arming wire to pull the arming pin assembly in the fuze. The tension in the wire withdraws the arming pin from the rotor, which releases the rotor to rotate by spring action to the armed position, thereby aligning its lead charges with the electric detonators and the booster charges. When the arming pin is pulled, the short across the two detonators is opened and the arming circuit is closed.

After the line charge is deployed on the ground, the operator rotates the firing control switch indicator to the "CHARGE" position (not shown) and repeatedly squeezes the handles of the 50 cap blasting machine, whereby an electrical pulse is transmitted through the special purpose electrical cable, the launcher safety switch assembly, the electrical lead, the arresting cable fuze connector and the fuze. On reaching the fuze, the pulse detonates the electrical detonators, which in turn detonate the leads in the rotor, the boosters in the disk and the penaerythritol tetranitrate (PETN) relays in the demolition charge fuze connector. Initiation of the PETN relays detonates the strands of the PETN detonating cord, which causes high order detonation of the composition C4 pellets in the linear demolition charge.

DESCRIPTION FO THE PRESENT M1134 FUZE

Figure 1:
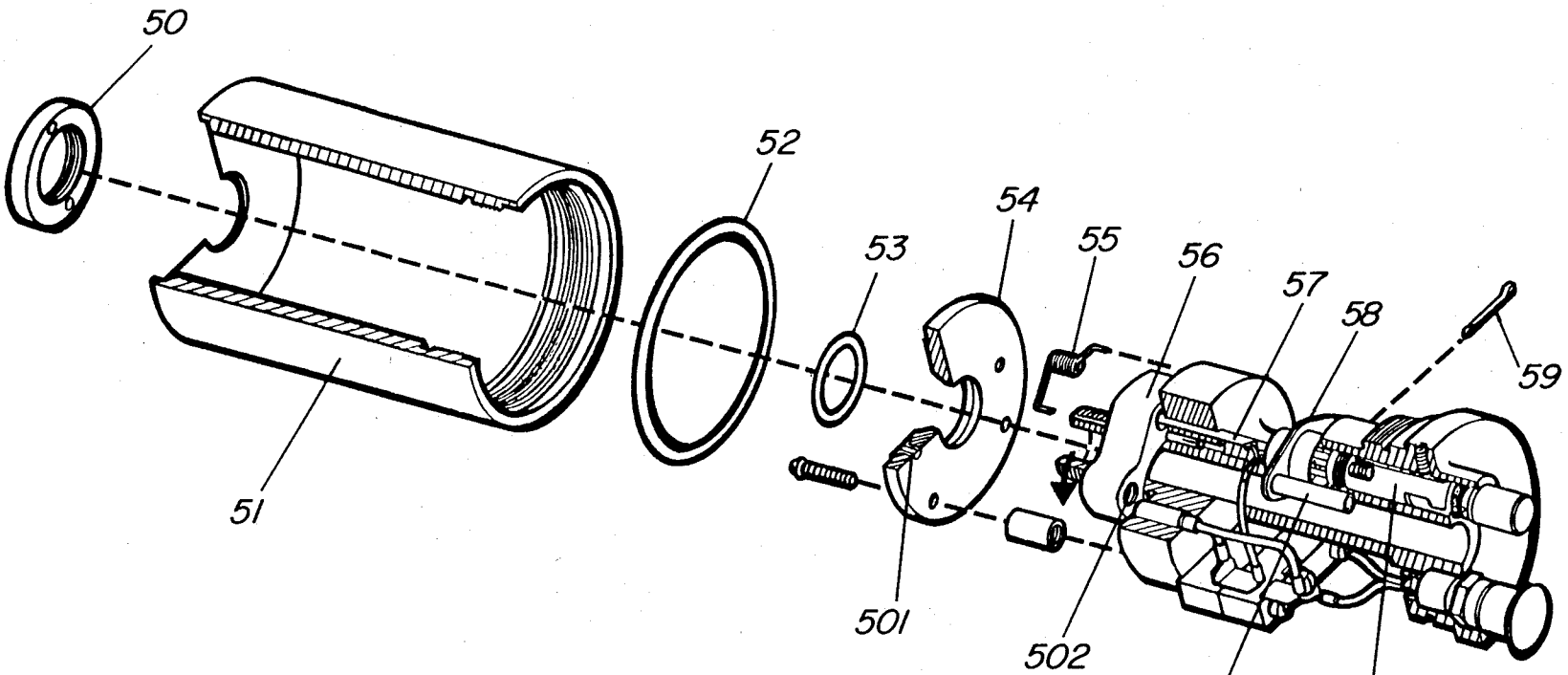
FIG. 1 (PRIOR ART)
FIG. 1 is an exploded view of the present M-1134 fuze.
Figure 2:
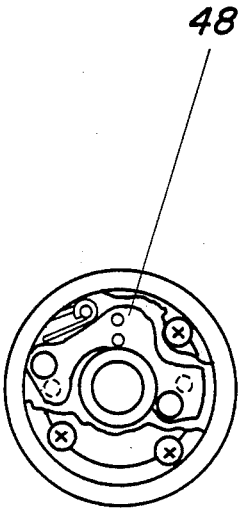
FIGS. 2 and 2A show a partial cutaway view of the present M-1134 fuze.
Figure 2A:
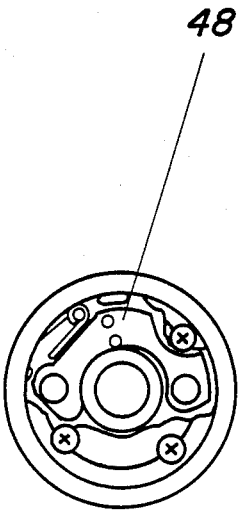
Figure 3:
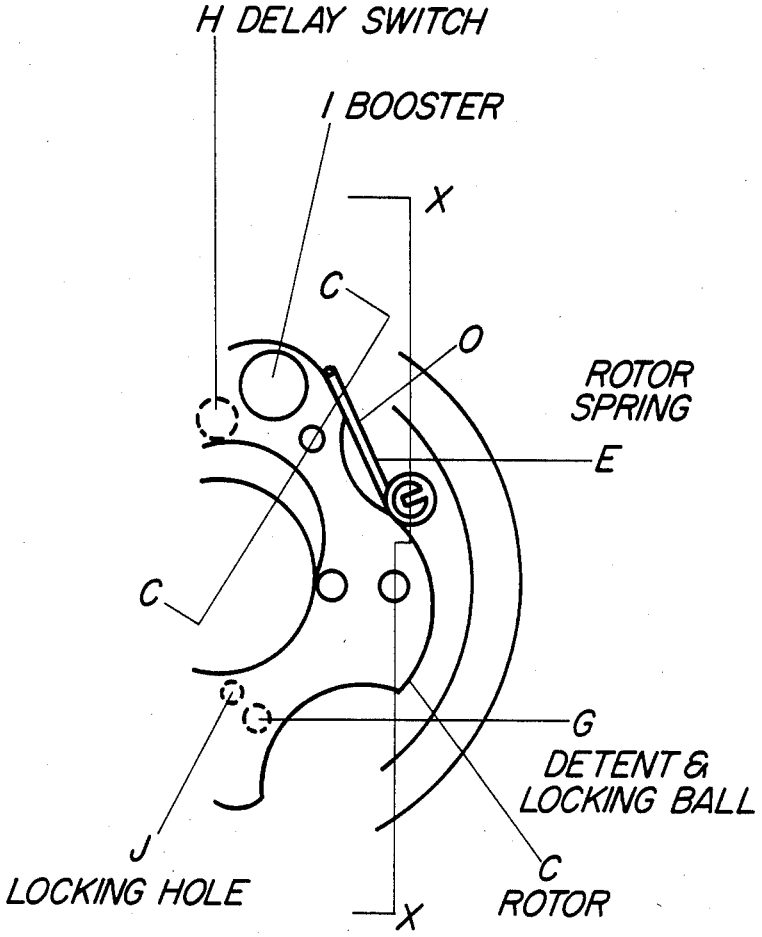
FIG. 3 shows an end plan view of internal parts of the present M-1134 fuze.

The present M1134 fuze is shown in FIGS. 1, 2 and 2A comprises a center tube enclosed in a crimped-on container, which is closed at the front end by a thin aluminum wall. The center tube contains a threaded portion, which is secured to the wall end of the container by a circular nut, and an externally threaded portion, which is threaded into the open end of the container, and also contains two slots for meshing the demolition charge connector with the fuze. The fuze is sealed against the entrance of moisture with two O-rings.

The center tube assembly contains (1) forward body section or disk having two passages containing booster pellets, (2) a rearward body section containing a capped electrical receptable, an arming pin assembly containing a firing switch and an electrical circuit for firing two electric detonators, 3) an intermediate body section with two passages containing two electric detonators, and (4) a rotor positioned between the intermediate body section and the forward body section or disk containing the electric detonators and the booster charges, respectfully. The arming pin assembly consists of an arming pin disconnect, a shear pin, a setscrew, a stop bar and an arming pin, wherein the shear pin prevents movement of the arming pin assembly until the arming wire tension is sufficient to shear it and retract the arming pin, which releases the rotor. The stop bar limits the rearward movement of the arming pin. The arming pin disconnect detaches from the fuze and is used to mechanically assemble the fuze with the arming wire connector (part of the arresting cable fuze connection). The stop bar and set screw combine to prevent the arming pin to be completely retracted from the center tube. Also, the rotor cavity for receiving the arming pin is conical in shape so that if the fuze is armed but not fired, the arming pin disconnect can be reinserted into the center tube, which pushes the arming pin back into the conical cavity, thereby rotating the rotor to the safe position. The fuze is about 3½ inches in diameter and about 4¾ inches long and weighs about 4 pounds.

When the arming pin is retracted to release the rotor, spring action rotates the rotor until the two lead charges in the rotor, the two electric detonators in the intermediate body section and the two boosters in the disk are aligned; at the same time the firing switch is closed.

DESCRIPTION OF THE FUZE OF THE PRESENT INVENTION

One embodiment of a fuze of the present invention is shown in FIGS. 3–6, and another embodiment is illustrated in FIGS. 7–10.

The fuze of the present invention as shown in FIGS. 3 to 6 is generally similar to the M1134 fuze in that it contains a center tube assembly enclosed in a cylindrical container EE. The center tube assembly comprises a radial disk-like forward body portion R containing two booster charges, a radial intermediate body section S containing two electric delay detonators, a rotor C, which is pivotably mounted between the forward and intermediate body sections and contains two lead charges and a first cavity V for receiving the first axial arming pin, and a rearward body portion T, which contains the first arming pin assembly, a dual electrical circuit including a switch assembly for two electrical detonators and a capped electrical receptacle for the electric cable.

Figures 4, 5, 6:
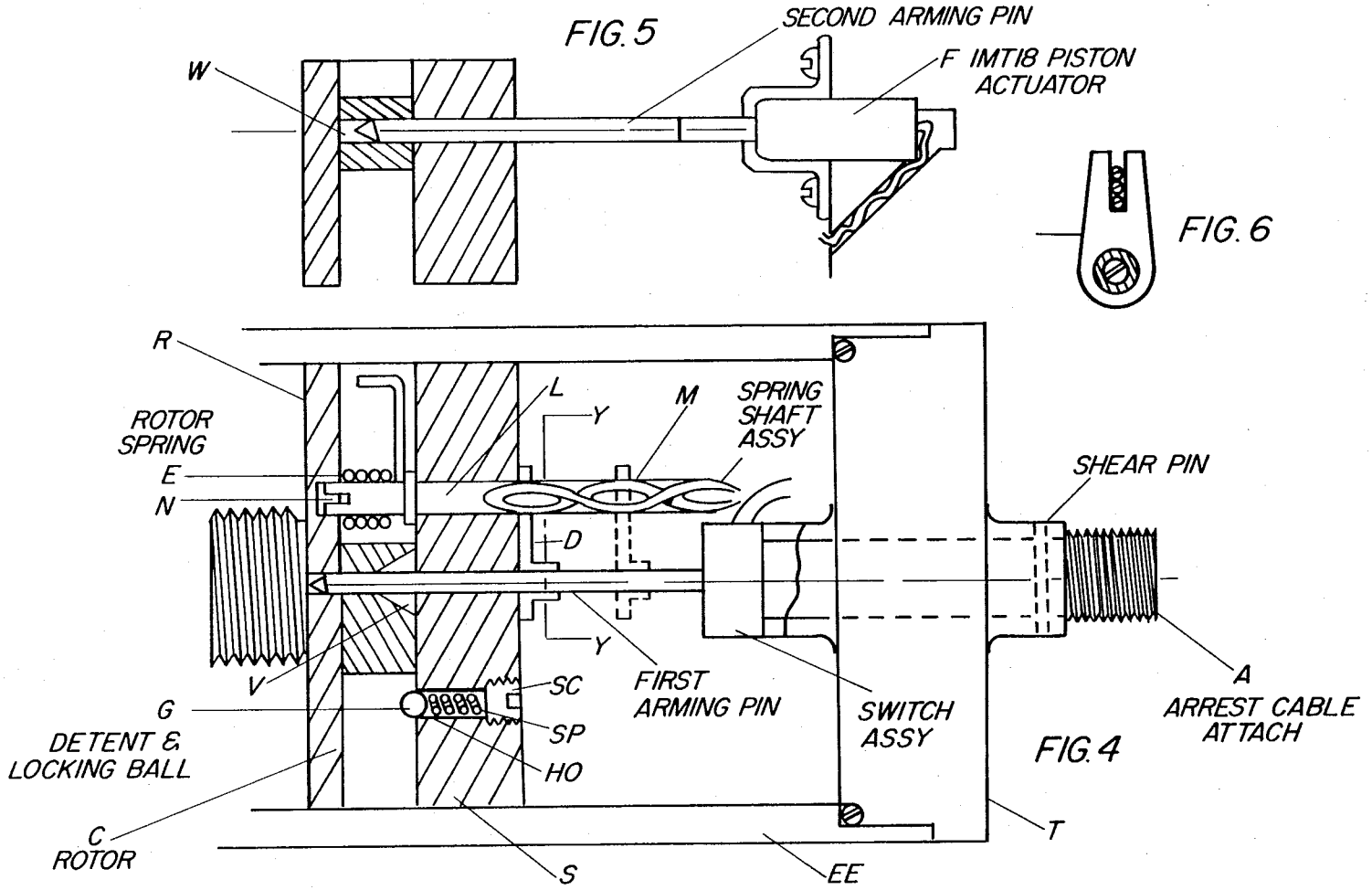
FIG. 4 is an axial section view along the angled line X—X of FIG. 3, of a fuze embodying the present invention.
FIG. 5 is an axial section view along the line C—C of FIG. 3, showing an electrically piston-actuated second arming pin of the fuze of the present invention.
FIG. 6 is a section view along line Y—Y of FIG. 4 showing a fork-like driver.
Figure 7:
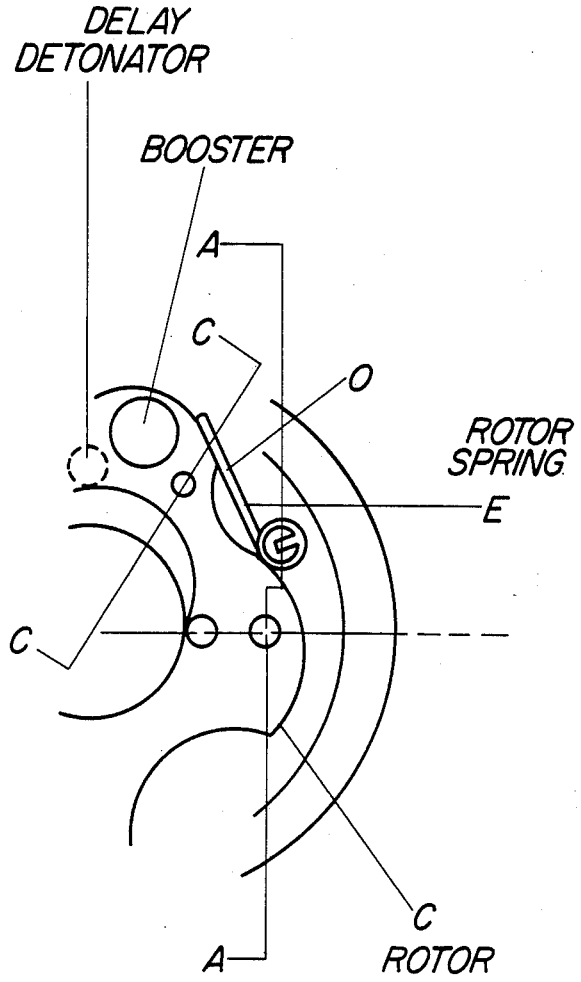
FIG. 7 is an end plan view of portions of the fuze.

In addition, the fuze of the present invention has a second axial arming pin, which is mounted in the rearward body portion T and extends into a second rotor cavity W, thereby providing a second safety lock. The second arming pin is retracted by an electrically actuated piston F. Also, the stored energy rotor spring of the M1134 fuze is replaced by a novel rotor spring assembly, wherein the rotor spring is installed in the free state, and hence does not possess the stored energy which could inadvertently activate the rotor and thereby arm the fuze. As shown in FIG. 4, the rotor spring assembly comprises a rotatable axial shaft L which is mounted in the intermediate body section S and possesses a helical, screw-like section M at one end and a slot N at the other end for anchoring a coiled torsion spring E containing an arm 0 for engaging and turning the rotor. The screw M is engaged by a fork-like driver D fixedly mounted on the first arming pin. The driver is driven by the rearward movement of the first arming pin produced by the pull of the arresting cable of the linear charge, whereby the linear motion of the arming pin is converted into rotation by the screw, which thereby winds up and preloads the rotor spring. Simultaneously, as this assembly moves the first arming pin (the first safety lock) from the rotor, it opens the shorting switch of the firing circuit. Also, the rotor has a locking hole J for receiving a detent and locking ball G, which is biased by a spring SP contained in a hole HO by a screw SC in the intermediate body section S, and normally locks the rotor in the safe position.

The operation of the novel fuze in the MICLIC is as follows:

When the line charge is deployed on the ground, the cable arrest A pulls and retracts the first arming pin from the rotor C, thereby releasing the first safety lock on the rotor, and also opens the shorting switch and closes a firing circuit for the electric detonator. At the same time the fork D rides up the screw-shaft M and thereby winds up and torques the rotor spring E. At this point the line charge has been deployed on the ground, and awaits the "charge" signal from the firing control switch. The operator then proceeds with the manual operating sequence by pressing the "charge" switch, thereby energizing the piston actuator F, which (1) retracts the second arming pin from the rotor and thereby releases the second safety lock on the rotor, allowing the rotor to rotate to the armed position, and (2) simultaneously energizes the delay detonators H. When the second safety lock is thus removed, the preloaded rotor spring E overrides the detent and locking ball G, thereby aligning the two lead charges in the rotor with the two delay detonators and the two booster charges. Following the expiration of the delay period (50 m sec.) the detonator actuates and fires the line charge.

The fuze of the present invention retains the fuze form (diameter and length) and the fuze interface with the line charge, and maintains the system sequence of operation.

Figures 8, 9, 10:
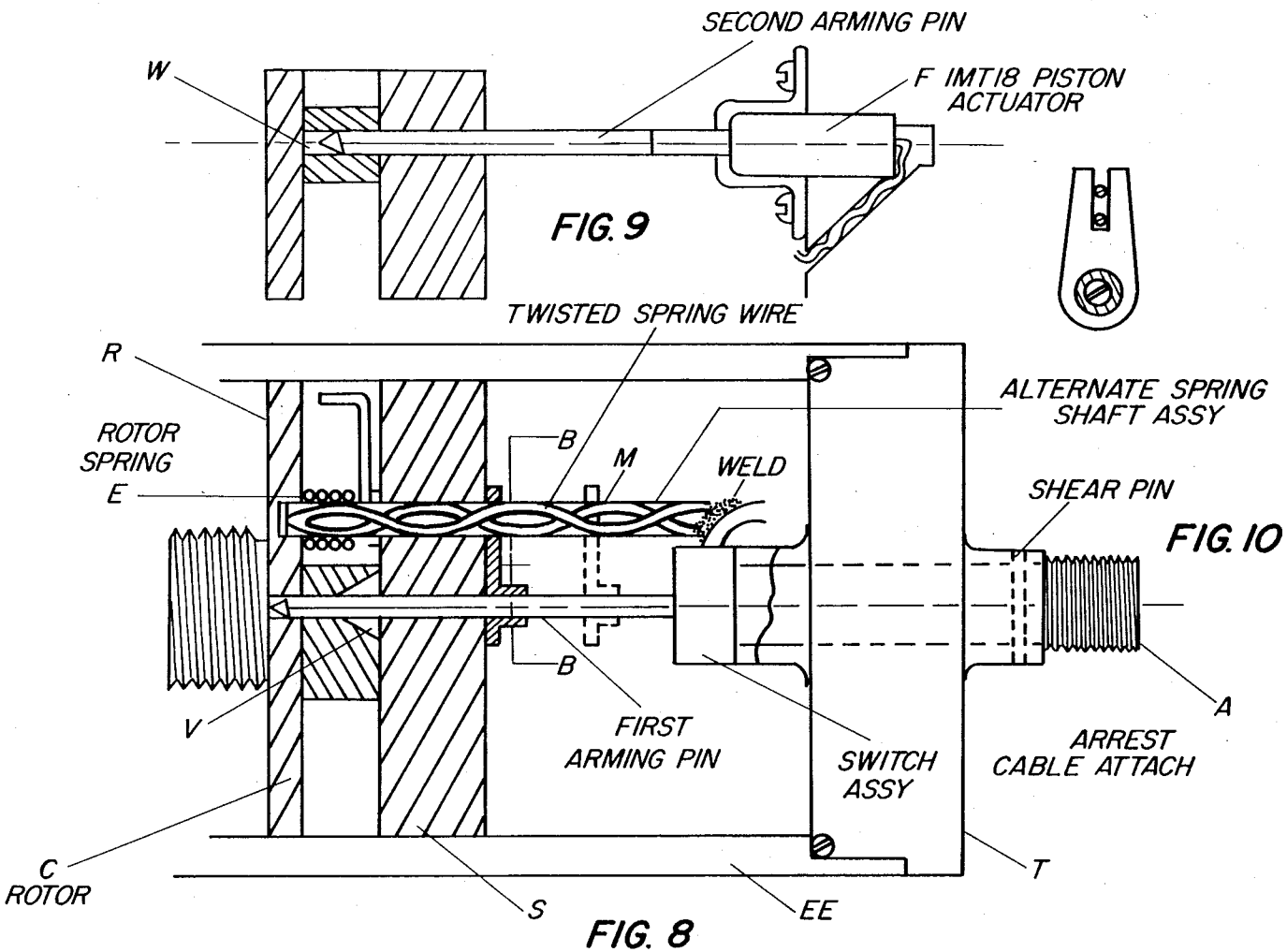
FIG. 8 is an axial section view along the angled line A—A of FIG. 7 of a fuze showing another embodiment of the present invention.
FIG. 9 is an axial section along line C—C of FIG. 8.
FIG. 10 is a section view along line B—B of FIG. 8.

Another embodiment of the rotor spring assembly of a fuze of this invention is shown in FIGS. 7–10, wherein the rigid screw/shaft portion shown in FIG. 4 is replaced by a pair of spring wires twisted into a screw-like form which can be fabricated from one continuous length of spring wire formed into a helix and welded at the end, as shown in FIG. 8. In this construction the spring wire screw can function as the torsion spring or primary elastic element, which serves to preload the rotor, in which case the coiled rotor torsion spring shown in FIG. 4 can be replaced by a rigid lever or arm for turning the rotor. Further, instead of the fork-like driver shape shown and described above, any driver configuration which is mounted on the first arming pin and mates with the screw-like configuration to rotate it, can be employed to wind up and preload the rotor spring.

What is claimed is:

1. In a fuze comprising a housing containing a forward body section having at least one passage containing a booster charge, an intermediate body section having at least one passage containing an electric detonator, a rearward body section having mounted therein a first slidable arming pin, and a rotor positioned between said intermediate body section and said forward body section, said rotor having at least one passage containing a lead explosive charge and a cavity for receiving the end of said arming pin to lock said rotor in the safe position, said rotor passage being angularly displaced from said electric detonator and booster charge passages when the rotor is in the safe position and being aligned with said passages when said arming pin is withdrawn to release said rotor to rotate to the armed position by means of a spring biasing means, wherein the improvement comprises:

(a) a second slidable arming pin mounted in said rearward body section, said pin being electrically actuated and extending into a second cavity in said rotor to provide a second lock of the rotor in the safe position;

(b) a rotor spring assembly for rotating said rotor from the safe position to the armed position, comprising:

(1) a rotatable shaft mounted in said intermediate body section having a screw-like portion extending into a space between said intermediate and rearward body sections and a rearward portion having an arm-like member for engaging and rotating said rotor, wherein one of said screw-like portion and said arm-like member is a torsion spring and one is essentially non-elastic; and (2) a driver means mounted on said first arming pin for engaging and rotating said screw-like portion of said shaft by the movement of said first arming pin from said rotor and thereby wind up and preload said torsion spring, whereby said torsion spring means is in a free, non-preloaded mode when said first arming pin locks said rotor in the safe position, is in a preloaded mode when said first arming pin is withdrawn from said rotor, and rotates said rotor to the armed position when said second arming pin is withdrawn from said second rotor cavity.

2. A dual safe fuze with spring preloader suitable for a line charge explosive system comprising a rocket attached to its forward end and a fuze and launcher cable attached to its rearward end, said fuze containing an electric detonator and requiring for the arming thereof the pull of the launcher cable on a first arming pin in combination with the electric actuation of a second arming pin therein, said electric detonator and second arming pin being initiated by a pulse from an electric cable connected thereto, which comprises:

a housing means containing a forward body section having at least one passage containing a booster charge, an intermediate body section containing at least one passage containing an electric detonator, and a rearward body section;

a rotor means positioned between said forward and intermediate body sections, said rotor means being rotatable between a safe position and an armed position and having at least one passage containing a lead explosive charge which in the safe position is angularly displaced from said passages containing said electric detonator and booster charge and is aligned with said passages in the armed position; and wherein said rotor means contains a first cavity for receiving the end of a first arming pin to provide a first lock of said rotor in the safe position and a second cavity for receiving the end of a second arming pin for providing a second lock of said rotor in the safe position;

a first arming pin assembly mounted in said rearward body section and containing a slidable arming pin into said first rotor cavity;

a second arming pin assembly mounted in said rearward body section and containing an electrically actuated slidable arming pin extending into said second rotor cavity;

a rotor spring assembly for rotating said rotor from the safe position to the armed position comprising:

(1) a rotatable shaft means mounted in said intermediate body section and having a screw-like portion extending into a space between said intermediate and rearward body sections and having an arm-like member for engaging and rotating said rotor, wherein one of said screw-like portion and said arm-like member is a torsion spring and the other is essentially non-elastic, and (2) a driver means affixed to said first arming pin for engaging and rotating said screw by movement of said first arming pin from said rotor means and thereby wind up and preload said torsion spring, whereby said torsion spring is in a free, non-preloaded mode when said first arming pin locks said rotor in the safe position, is in a preloaded mode when said first arming pin is withdrawn from said rotor, and rotates said rotor to the armed position when said second arming pin is withdrawn from said second rotor cavity.

3. A fuze according to claim 1 or 2, wherein the screw-like portion is rigid and the arm-like member is a torsion spring.

4. A fuze according to claim 1 or 2, wherein the screw-like portion is a torsion spring and the arm-like member is a rigid member.

5. A fuze according to claim 1 or 2, wherein said driver means has a forklike configuration.

6. A fuze according to claim 1 or 2, wherein the second arming pin and the electric detonator are actuated simultaneously and the detonator is a delay detonator.

7. A fuze according to claim 1 or 2, wherein said electric detonator is connected to an electric firing circuit containing a shorting switch actuated by said first arming pin, whereby said switch is closed and the current is open when said pin locks said rotor in the safe position, and is opened when said pin is withdrawn from said first rotor cavity, thereby closing the firing circuit.

8. A fuze according to claim 1 or 2, wherein said intermediate body section has a cavity containing a spring-biased detent and locking ball and said rotor contains a cavity for receiving said ball for holding said rotor in the safe position, and wherein said torqued rotor spring overrides said detent and locking ball and rotates said rotor to the armed position when said second arming pin is withdrawn from said second rotor cavity.

9. A fuze according to claim 1 or 2, wherein said intermediate body section, rotor means and forward body section each contain two of said passages containing said electric detonators, lead charges and booster charges, respectively.

* * * * *